PHILIP L. TURNER
INVENTOR.

United States Patent Office 3,497,663
Patented Feb. 24, 1970

3,497,663
ELECTRODE FEEDING MECHANISM
Philip L. Turner, Southfield, Mich., assignor to Ford Motor Company, Dearborn, Mich., a corporation of Delaware
Filed Mar. 22, 1968, Ser. No. 715,254
Int. Cl. B23p *1/08, 1/12;* H05b *31/18*
U.S. Cl. 219—69          8 Claims

ABSTRACT OF THE DISCLOSURE

An elongated hollow electrode for an electrical discharge machining device is engaged by a collet at the end of a holder and extends into a fluid passage in the holder. When the holder is retracted, a spring loaded positioning device moves in front of the electrode tip and a draw bar releases the grip of the collet on the electrode. Fluid pressure forces the electrode forward until the force exerted on the electrode tip by the fluid passing between the tip and the positioning device balances the force exerted by the fluid pressure on the inner end of the electrode. As the holder moves forward, the collet re-engages the electrode and insures that the electrode extends a predetermined distance from the end of the holder at the beginning of each electrical machining cycle.

SUMMARY OF THE INVENTION

Electrical machining techniques are being introduced on an increasing scale for producing parts at a mass production rate. One of the more prominent uses involves using electrical discharge machining (EDM) techniques to form the extremely accurate fuel passages in carburetors. Passages of any cross-sectional shape can be formed by EDM, which is a considerable advantage relative to the circular cross section of mechanically drilled passages. More important, however, is the greater predictability of the condition of the edges around the passage openings when formed by EDM techniques. No burrs are formed at the edges and finer tolerances on passage sizes are possible.

During the actual electrical machining of a passage the electrode must be maintained a very short distance from the workpiece, and various proximity devices that continuously monitor the distance between the electrode and the workpiece are used to control a feeding mechanism accordingly. Because of the high accuracy required from these proximity devices, their rate of movement is limited to extremely low values.

Positioning the electrode near the surface of the workpiece at the beginning of each machining operation becomes extremely critical when the machinery is being used on mass production parts, since the slow electrode movement when no machining is being done is wasted time. In addition, the length of a passage generally is critical and moving the electrode a predetermined distance from an established starting point is a convenient means of controlling passage length. Electrode positioning during mass production is complicated by the fact that small but widely varying amounts of electrode erosion take place during each machining operation.

This invention provides an electrode positioning mechanism that positions the electrode in a predetermined location relative to a workpiece prior to the machining operation. The positioning mechanism is sufficiently accurate to eliminate most of the time wasted by the slow movement of proximity devices prior to beginning the actual machining, while being relatively inexpensive to build and operate. In the positioning mechanism an elongated hollow electrode holder is mounted for longitudinal movement relative to a stationary housing. A draw bar mounted for longitudinal movement relative to the holder has a clamping means attached to one end. The electrode is mounted in the passage of the hollow member and is engaged by the clamping means when the holder is extended and released therefrom when the holder is in a fully retracted position. A stop means mounted on the housing moves into a position adjacent the outer end of the electrode when the holder is fully retracted.

A fluid supplied to the passage in the hollow member to sweep out particles removed during the machining acts on the inner end of the electrode and moves the electrode tip to a predetermined position relative to the stop when the electrode is released by full retraction of the holder. The electrode preferably is hollow and the fluid carried thereby passes between the electrode tip and the stop member when the force exerted by the fluid on the electrode tip is balanced by the fluid pressure force exerted on the inner end of the electrode. As the holder begins extending, the clamping means re-engages the electrode and the stop means swings away from the outer end of the electrode. Thus, the electrode always extends a predetermined distance from the end of the holder at the beginning of the machining operation.

DETAILED DESCRIPTION

Figure 1:
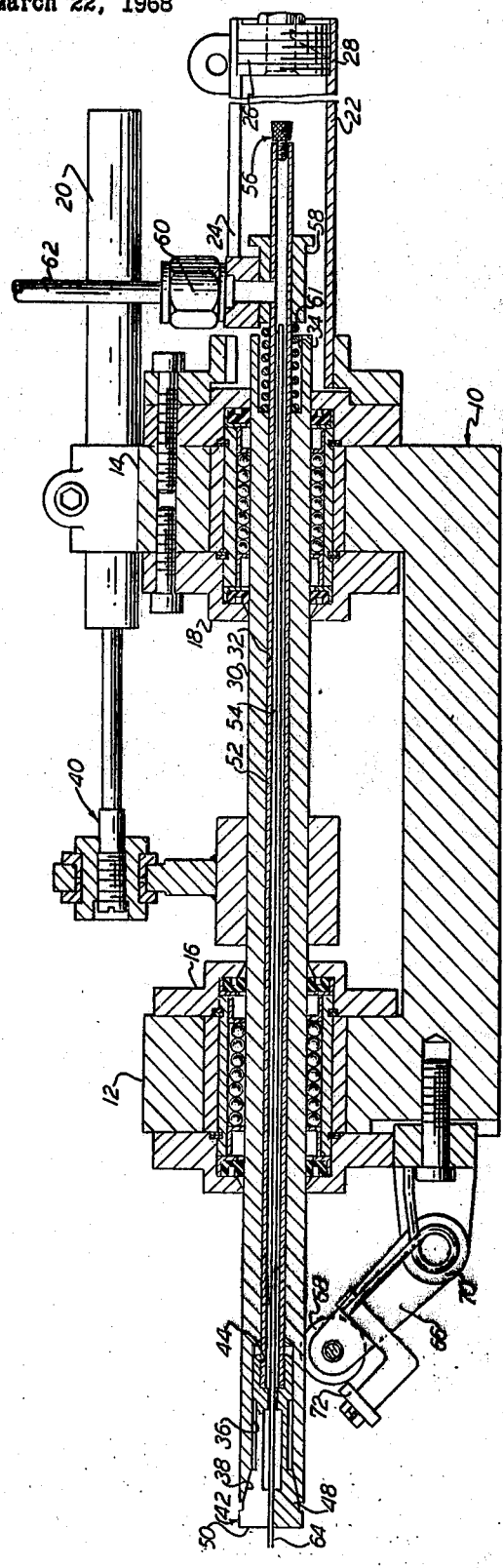
FIGURE 1 is a sectioned elevation of a positioning mechanism of this invention useful in electrically machining passages in carburetors showing the hollow electrode holder in its extended position with the collet engaging the electrode.

Referring to FIGURE 1, the positioning mechanism comprises a housing 10 having front and rear upstanding supports 12 and 14, respectively. Bearing assemblies 16 and 18 are located in the respective front and rear supports and are coaxial with each other. The housing 20 of a position potentiometer is fastened to the top of rear support 14 and a cylindrical extension 22 is fastened to the back side of rear support 14. Extension 22 has a longitudinal slot 24 on its top and a cap 26 having a passage 28 therein threaded into its end.

A cylindrical electrode holder 30 is located in bearing assemblies 16 and 18 for axial movement. Holder 30 is hollow and contains a concentric passage 32. The rearward end of passage 32 has a straight counterbore 34 and the forward end has a counterbore 36 with a tapered opening 38. Holder 30 is fastened to the tap of the position potentiometer by a fastening mechanism represented generally by numeral 40.

Figure 2:
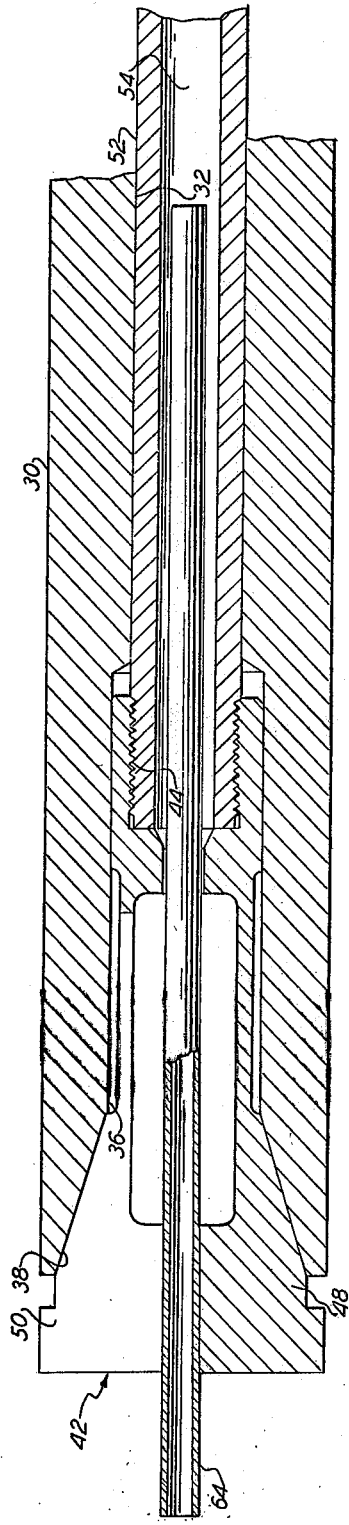
FIGURE 2 is an enlarged view of the collet end of the hollow electrode holder showing structural details of a concentric draw bar.
Figure 3:
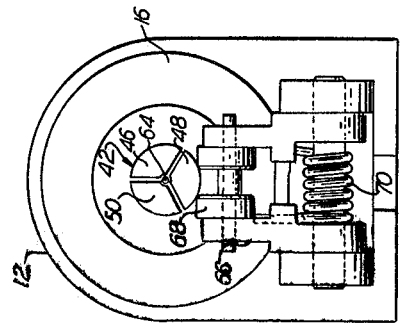
FIGURE 3 is a view of the electrode end of the positioning mechanism showing details of the engaging collet and the stop means.

Referring to FIGURES 2 and 3 also, a clamping collet 42 is positioned in counterbore 36. The inner end of collet 42 contains a threaded counterbore 44 while the outer end is sliced into three sectors 46, 48 and 50 (see FIGURE 3) and has an exterior taper designed to ride in opening 38. A draw bar 52 is slidably and concentrically mounted in passage 32 and is threaded into counterbore 44 of collet 42. Draw bar 52 extends from the rearward end of holder 30 and contains a passage 54 that is closed at its rearward end by a plug 56. A sleeve 58 is attached to draw bar 52 just outside of the rearward end of holder 30 and sleeve 58 in turn is fastened to an adapter 60 that is connected to a fluid pipe 62. Adapter 60 is located in slot 24 so the adapter can move axially relative to extension 22. A compressive spring 61 seats in counterbore 34 and bears on sleeve 58, thereby urging sleeve 58 in a rearward direction relative to holder 30.

A hollow electrode 64 is located in the passage in draw bar 52 and extends through collet 42 to terminate a short distance outside of collet 42. The other end of electrode 64 terminates within the passage in draw bar 52 forward of the fluid inlet in sleeve 58 (see FIGURE 1).

Referring to FIGURES 1 and 3, an arm 66 is pivotally fastened to the front support 12. A roller 68 at the upper end of arm 66 contacts the lower exterior of holder 30 and arm 66 is spring loaded by a spring 70 to maintain this contact. A positioning stop 72 is fastened to arm 66 as shown in FIGURE 1; stop 72 has been removed from FIGURE 3 for clarity.

OPERATION

Electrode holder 30 and its attached parts are moved axially by conventional electrical, hydraulic, pneumatic, or mechanical means, with the positioning potentiometer generating a signal from which the position of the holder can be determined. Movement of the holder toward the left of FIGURE 1 brings electrode 64 toward a workpiece (not shown) and movement toward the right retracts the electrode from the workpiece. A conventional electrical discharge machining fluid is supplied to pipe 62 and passes through passage 54 and the passage in the electrode to sweep out the particles produced during the machining operation.

As holder 30 nears the fully retracted position, cap 26 contacts sleeve 58 and further movement of holder 30 to the right compresses spring 61, thereby permitting holder 30 to continue its leftward movement while stopping draw bar 52. Draw bar 52 forces clamping collet 42 out of the tapered opening 38, which permits the sectors of the clamping collet to open and release electrode 64.

Additionally, as holder 30 moves into the fully retracted position, arm 66 pivots upward in front of holder 30 to position stop 72 adjacent the electrode tip. When collet 42 releases the electrode, the fluid pressure in passage 54 acts on the inner end of the electrode and moves the electrode outward until its force is balanced by the force exerted on the electrode tip by the fluid passing through the space between the tip and the stop.

While this operation is taking place, a new workpiece is positioned a predetermined distance in front of the electrode. An electrode holder 30 begins moving to the left, compressive spring 61 holds sleeve 58 and draw bar 52 substantially stationary until the collet 42 has clamped on the electrode. Continued movement of the electrode holder 30 acts on roller 68 to pivot arm 66 downward to the position shown in FIGURE 1.

The electrode now projects a predetermined distance from the front of holder 30, and holder 30 can be moved rapidly to a predetermined position close to the workpiece without fear of contact between the electrode and the workpiece. Movement to this predetermined position is controlled by the position potentiometer. When the position is reached, electrical discharge machining begins and a conventional proximity device is used to control the position of the electrode relative to the workpiece. The position potentiometer then senses when the holder has moved a distance known to produce a passage of the proper length, and the moving means then retracts the holder to begin another cycle starting with a repositioning of the electrode in the holder.

Using a hollow electrode permits positioning the electrode without actually contacting the electrode tip by virtue of the hydraulic pressure balance. Fluid pressures of about 50 p.s.i. are useful in positioning hollow electrodes efficiently. Solid electrodes can be used if desired, but there is some risk of damaging the electrode tip by the impact of the tip against the stop.

Thus this invention provides a positioning mechanism that accurately repositions an electrical machining electrode at the beginning of each machining cycle. The mechanism uses a fluid balance to avoid actual contact between the electrode tip and the stop means.

What is claimed is:

1. In an electrical machining device having means for passing electrical current between an electrode and a workpiece, an electrode positioning mechanism comprising
   a housing,
   an elongated electrode holder mounted for longitudinal movement relative to said housing and having a passage therein,
   a draw bar mounted for longitudinal movement relative to said holder, said draw bar having a clamping means attached to one end, said clamping means being in a releasing configuration when the holder is retracted and in a clamping position when the holder is extended, said electrode being mounted for clamping by said clamping means and being longitudinally movable relative to said holder when released from said clamping means,
   a stop means mounted on said housing for movement into a position adjacent the outer end of the electrode when the holder is retracted, and
   fluid means for urging said electrode tip into a predetermined position relative to said stop means when said clamping means releases said electrode.

2. The electrical machining device of claim 1 in which the draw bar is hollow and is mounted in the passage in said electrode holder, and the electrode is located within the draw bar.

3. The electrical machining device of claim 2 in which the electrode is hollow and the predetermined position of the electrode tip relative to the stop means when the clamping means has released the electrode is determined by a fluid pressure balance between the ends of the electrode.

4. The electrical machining device of claim 3 comprising a spring means loading the draw bar relative to the holder, said spring means urging the draw bar into said clamping position.

5. The electrical machining device of claim 4 in which the electrode holder retracts into a housing extension, said draw bar contacting said housing extension to compress the spring means and release the electrode when the holder is retracted.

6. The electrical machining device of claim 5 comprising a positioning potentiometer fastened to the electrode holder, said potentiometer generating a signal representative of the position of the holder.

7. The electrical machining device of claim 1 in which the electrode is hollow and the predetermined position of the electrode tip relative to the stop means when the clamping means has released the electrode is determined by a fluid pressure balance between the ends of the electrode.

8. The electrical machining device of claim 1 comprising a positioning potentiometer fastened to the electrode, said potentiometer generating a signal representative of the position of the holder.

References Cited
UNITED STATES PATENTS 1,963,915 6/1934 Kennedy et al. ____ 314—68 X
3,125,700 3/1964 Bentley et al.

JOSEPH V. TRUHE, Primary Examiner

R. F. STAUBLY, Assistant Examiner

U.S. Cl. X.R.

204—143; 314—68